US012662423B2

(12) United States Patent
Raponi

(10) Patent No.: US 12,662,423 B2
(45) Date of Patent: Jun. 23, 2026

(54) CEMENTITIOUS COMPOSITION

(71) Applicant: SUMMA-MAGNA 1 CORPORATION, Martville, NY (US)

(72) Inventor: Gale A Raponi, Martville, NY (US)

(73) Assignee: SUMMA-MAGNA 1 CORPORATION, Martville, NY (US)

( * ) Notice: Subject to any disclaimer, the term of this patent is extended or adjusted under 35 U.S.C. 154(b) by 356 days.

(21) Appl. No.: 18/283,949

(22) PCT Filed: Mar. 15, 2022

(86) PCT No.: PCT/US2022/020369
§ 371 (c)(1),
(2) Date: Sep. 25, 2023

(87) PCT Pub. No.: WO2022/203901
PCT Pub. Date: Sep. 29, 2022

(65) Prior Publication Data
US 2024/0166562 A1      May 23, 2024

Related U.S. Application Data

(60) Provisional application No. 63/166,644, filed on Mar. 26, 2021.

(51) Int. Cl.
| | |
|---|---|
| *C04B 18/08* | (2006.01) |
| *C04B 14/06* | (2006.01) |
| *C04B 14/22* | (2006.01) |
| *C04B 18/12* | (2006.01) |
| *C04B 18/14* | (2006.01) |
| *C04B 18/16* | (2023.01) |
| *C04B 18/165* | (2023.01) |
| *C04B 18/20* | (2006.01) |
| *C04B 18/22* | (2006.01) |
| *E04C 5/07* | (2006.01) |

(52) U.S. Cl.
CPC .............. *C04B 18/08* (2013.01); *C04B 14/06* (2013.01); *C04B 14/22* (2013.01); *C04B 18/12* (2013.01); *C04B 18/141* (2013.01); *C04B 18/16* (2013.01); *C04B 18/165* (2013.01); *C04B 18/20* (2013.01); *C04B 18/22* (2013.01); *E04C 5/073* (2013.01)

(58) Field of Classification Search
CPC ......... C04B 18/08; C04B 14/06; C04B 14/22; C04B 18/12; C04B 18/141; C04B 18/16; C04B 18/165; C04B 18/20; C04B 18/22; C04B 2111/28; C04B 2111/30; C04B 2111/40; C04B 28/02; C04B 14/041; C04B 18/06; C04B 24/2611; E04C 5/073; Y02W 30/91
See application file for complete search history.

(56) References Cited

U.S. PATENT DOCUMENTS

| | | | |
|---|---|---|---|
| 2011/0306255 A1* | 12/2011 | Rathenow | C04B 28/26 |
| | | | 442/164 |
| 2012/0325120 A1 | 12/2012 | Shendy et al. | |
| 2013/0196061 A1 | 8/2013 | Hull | |
| 2018/0194679 A1 | 7/2018 | Guynn | |
| 2019/0337850 A1* | 11/2019 | Ali | C04B 18/20 |
| 2020/0024201 A1 | 1/2020 | Turcinskas et al. | |
| 2020/0407276 A1 | 12/2020 | Sampson | |

FOREIGN PATENT DOCUMENTS

| | | | | | |
|---|---|---|---|---|---|
| CN | 1162576 | A | * | 10/1997 | ........ C04B 40/0277 |
| CN | 1810701 | A | * | 8/2006 | |
| CN | 109553352 | A | * | 4/2019 | ............ C04B 28/04 |
| CN | 110650934 | A | | 1/2020 | |
| CN | 111454040 | A | * | 7/2020 | ........ C04B 40/0277 |
| EP | 0467483 | A1 | * | 1/1992 | .......... C04B 14/104 |
| EP | 0918045 | A1 | * | 5/1999 | .............. C05G 5/35 |
| JP | H11322386 | A | * | 11/1999 | ............ C04B 26/26 |
| WO | WO 97/05079 | A1 | | 2/1997 | |
| WO | WO-2012073258 | A2 | * | 6/2012 | ............ C04B 26/16 |

OTHER PUBLICATIONS

EP046783A1 translation (Year: 1992).*
CN111454040 Machine translation (Year: 2019).*
CN1162576A machine translation (Year: 1997).*
CN1810701A (Year: 2006).*
JPH11322386A machine translation (Year: 1999).*
CN10953332A translation (Year: 2019).*
Chinese Office Action for Chinese Application No. 202280024567. 5, dated May 10, 2025, with English translation.
International Search Report, issued in PCT/US2022/020369, dated Jun. 1, 2022.
Written Opinion of the International Searching Authority, issued in PCT/US2022/020369, dated Jun. 1, 2022.

* cited by examiner

*Primary Examiner* — Pamela H Weiss

(74) *Attorney, Agent, or Firm* — Birch, Stewart, Kolasch & Birch, LLP

(57) ABSTRACT

A cementitious composition, including for the molding of relatively light-weight, heat-insulative, nailable, structural units such as bricks, blocks, roof decking, etc. The composition may include an inorganic cementitious settable admixture within which is incorporated a significant proportion of waste industrial products, such as concrete, blacktop, windmill blades, brick chips, plastics, cordierite, tires, stack dust and/or fly ash, ceramics, clays, metals and plastics. The waste industrial products may be incorporated into the composition in various proportions.

20 Claims, No Drawings

CEMENTITIOUS COMPOSITION

CROSS REFERENCE TO RELATED APPLICATIONS

This application is the National Phase of PCT International Application No. PCT/US2022/020369, filed on Mar. 15, 2022, which claims priority under 35 U.S.C. 119 (e) to U.S. Provisional Application No. 63/166,644, filed on Mar. 26, 2021, all of which are hereby expressly incorporated by reference into the present application.

BACKGROUND OF THE INVENTION

1. Field of Invention

The present invention is directed to an improved cementitious composition, including for the molding of relatively light-weight, heat-insulative, nailable, structural components such as bricks, blocks, beams, columns, roof decking, retaining walls, etc. The composition may include an inorganic cementitious settable admixture within which is incorporated a significant proportion of waste industrial products, such as concrete, blacktop, brick chips, plastics, cordierite, tires, stack dust and/or fly ash, ceramics, clays, metals and plastics. The waste industrial product(s) may be incorporated into the composition in various proportions depending on the desired characteristics.

2. Description of the Background Art

U.S. Pat. No. 4,058,406, herein "406 Patent," describes a composition that includes a mixture of hydraulic cement, aggregate, water and waste polyethylene coated fiberboard strips. U.S. Pat. No. 7,473,311, herein "311 Patent," describes the use of industrial recyclable materials in combination with cement mixtures and virgin polyethylene strips, where the virgin polyethylene strips may be in the form of ribbon-like strips having varying width, length and thickness and may be randomly distributed within the cementitious mixture. The '406 Patent and the "311 Patents are incorporated herein by reference in their entirety.

SUMMARY OF THE INVENTION

The present invention is directed to an improved cementitious mixture that incorporates waste industrial products in certain proportions to replace a percentage of traditional aggregates. This achieves desired compressive strength and tensile strength goals, to reduce carbon footprint, improve resiliency, reduce permeability, reduce weight, improve thermal properties, improve workability and flow, and improve imperviousness to sea water.

Further scope of applicability of the invention will become apparent from the detailed description given hereinafter. However, various changes and modifications within the scope of the invention will become apparent to those skilled in the art from this detailed description.

DETAILED DESCRIPTION OF THE PREFERRED EMBODIMENTS

The present invention is directed to multiple cementitious compositions, including self-consolidating concrete (SCC) compositions, utilizing industrial and other material waste that would otherwise end up in a landfill or other environmentally undesirable location.

SCC, also referred to as self-compacting concrete, is a highly flowable, non-segregating concrete that can fill formwork, spread in place and encapsulate any reinforcement used, without the need for any mechanical consolidation. Generally, SCC has a slump flow of 20 to 30 inches. SCC results in reduced labor, improved consolidation of the concrete, smoother surfaces, better hardened properties, reduced need for equipment and is self-leveling. Slump is the measure of concrete consistency and fluidity and slump shows the flow and overall workability of freshly mixed concrete before the concrete sets. Slump may also be an indicator of whether the concrete is mixed and a slump test is used to ensure uniformity for different loads of concrete under conditions in the field (i.e., where the concrete is to be used). The higher the slump, the wetter the mix. Four-inch (4") slump is very common with normal weight concrete and is a good for pumping.

The following examples utilize various forms of cement, such as crushed concrete, and may include polyethylene, the polyethylene may be in the form of strips or ribbons of various lengths, widths and thicknesses, tire chips, fly ash and/or bottom ash, granite sand, foundry sand, plastic, granite stones, brick, including crushed brick, glass, silica fume, cardboard paper, slag, stone, water reducer, sand, air entrainment admixture for free-thaw durability, basalt fiber, blacktop millings, quarry dust powder (QDP), wood chips and other wood known products, styrene and windmill blades, but is not limited thereto.

QDP is a waste product generated from a quarry stone mining and conveying, and is typically used either as a filler material/base material, such as a base for a concrete pad, or otherwise disposed of. The present invention utilizes QDP alone in the cementitious composition, or utilizes a blended mix of QDP with ⅜ minus sand, in a ratio of 60-80% ⅜ minus sand with 20-40% QDP. QDP acts is a supplementary cementitious material (SCM) and reduces the need for cement to maintain a similar strength value. Preferably, for increased strength and resiliency, a blended mix of 70% sand to 30% QDP is used. Further, the use of QDP lowers the effective $CO_2$ emissions from the quarry stone manufacturing and conveying processes.

Water reducers are known in the art to include ligno-sulfonates or synthetic sulfonate and polycarboxylate, among other chemicals, and is added to concrete prior to pouring to reduce the water content, decrease porosity, increase the strength, reduce water permeability, reduce diffusivity and improve the finish of the concrete.

Slag is a SCM produced as a by-product from metal manufacturing processes, such as during smelting or the refining of ore. Slag may be in the form of metal oxides and silicon dioxides, and may contain metal sulfides and elemental metals, as known in the art. For example, during production, iron-based materials are heated in a blast furnace to a molten state and slag rises to the top and is separated from the iron for further processing. Slag may be separated from the iron and rapidly cooled with water (granulated), to change the morphology of the slag in order to provide it cementitious properties. The granulated slag is then ground to a predetermined size, and the final produce is called a ground granulated blast furnace slag (GGBFS).

Slag can be ferrous if produced from iron and steel, a ferroalloy, or non-ferrous if produced from copper, nickel, zinc and phosphorus, for example. Slag is typically dumped into holes, and can produce highly alkaline groundwater, including PH values of about 12. Therefore, the present invention utilizes slag, see Example 10, for instance, in order to reduce its potential environmental impact. That is, when used in the cementitious composition of the present invention, slag is trapped within the composition, including in a composition having fly ash and/or bottom ash, thereby avoiding direct exposure to groundwater.

Cement used in the present invention may be any type of cement, such as Types I-IV per ASTM C150 and air entraining Types IA, IIA, and IIIA per ASTM C150. Many of the examples listed below utilize ASTM C150 Type III.

The mix designs may include windmill blades (i.e., wind turbine blades) that have been ground or shredded to a predetermined size, and may also include cordierite and carbon fiber that are milled or ground to a predetermined size and shape for use in cementitious compositions. Cordierite is a by-product of glass manufacturing and may be obtained from recycling catalytic converters, as catalytic converters may be comprised of ceramic containing a large proportion of synthetic cordierite.

Fly ash is known in the art as a coal combustion waste product, as described in the '311 Patent. The fly ash may be sifted or otherwise filtered to a particular dimension. Fly ash is utilizes in the present invention to reduce the need for cement (i.e., allow for a lower percentage of cement), which increase the set up time (i.e., the amount of time before the cementitious composition begins to harden).

Further, basalt fiber may be recycled or recovered from damage basalt rods. Further, the cementitious composition of the present invention is preferably used with basalt rods (i.e., basalt rebar rods), in which the basalt rods are used as a replacement for rebar to reinforce the concrete mix and provide improved tensile strength, thermal stability, and is non-toxic, non-corrosive and non-reactive with air and water. Basalt rods are produced from mined igneous rock that are melted and extruded into rods.

Plastics used in the cementitious composition of the present application may include polyethylene (PE), polyethylene terephthalate (PET), polyethylene terephthalate ethylene (PETE), polypropylene (PP), polyamide/nylon (PA), phenol formaldehyde resin (PF), acrylonitrile butadiene styrene (ABS), high-density polyethylene or polyethylene high-density (HDPE), thermoplastic olefin, thermoplastic polyolefin (TPO), or olefinic thermoplastic elastomers, and the like. The plastics used in the cementitious composition of the present application may be in the form of commercially available pellets or strips, as known in the art. The pellets may be any size available, including ¼ in (e.g., ¼ in minus). For instance, the plastics utilized in the cementitious composition of the present invention may be recycled, and may be shredded, melted or remolded into any desired shape and size. However, preferably, the plastic is in the form of either pellets or strips.

PE may be in the form of strips, as described in the '311 Patent. For instance, the '311 Patent discloses that virgin polyethylene strips are typically cut into ribbon-like pieces and added to the mixture and comprise polyethylene and do not contain any substantial amount of non-polyethylene material (311 Patent column 2, line 66-column 3, line 3). The PE strips may be evenly mixed throughout the entirety of the cementitious mixture prior to curing.

Silica fume, as known as microsilica, is an amorphous polymorph of silicon dioxide. Silica is generally provided as an ultrafine powder and is a by-product of producing silicon metal or ferrosilicon alloy production including due to the production of computer chips. Silica fume may be comprised of spherical particles with an average particle diameter of 150 nm. One of the most beneficial uses for silica fume is in concrete. Because of its chemical and physical properties, it is a very reactive pozzolan (also known as pozzolana). Pozzolan is also found as natural deposits in the earth. Pozzolan, in the presence of moisture, chemically reacts with calcium hydroxide (i.e., slaked lime) to form compounds having cementitious properties. Therefore, the use of silica fume improves strength and durability of concrete.

Water reducers are used in cementitious mixes to maintain a desired water to cement ratio, such as to minimize the water to cement ratio, and provide for a high slump. In addition, water reducers may be used in the SCC to provide near neutral set properties.

Cementitious material includes ash (e.g., fly ash and bottom ash), cordierite, slag, silica fume and cement. According to the present invention, the water to cementitious material (W/C ratio) of should be roughly 0.4 to 0.6 per IS code 10262. More specifically, the present invention seeks to produce a W/C ratio of 0.4 for optical performance, including for improving compressive strength, reducing shrinkage, reducing cracking and reducing curling.

Each of the following examples (Examples 1-49 below) may be used in the following forms: wall panels, roof panels, poured roof insulation, underground junction boxes, railroad ties, railroad beds, beams, columns and piling, septic and sewage systems, manholes, piping of all types, sound attenuation panels, airport construction, riprap for coastal erosion, transformer pads, seawall panels, dilution (i.e., isolation or storage) of radioactive waste, other hazardous waste capsules, jackets for fuel storage tanks, highway median barriers, marine military obstacles and precast for jetties, artificial reefs and other marine structures, road bases, runways, bridge piers, bridge fenders, silos (including missile silos), foundations, fixation of contaminated solids, slabs, seawalls, soil stabilizers, landfill liners, pour in place insulation for oxidizing and other high temperature tanks, housing (including for fighter aircraft), dams, smoke stacks and other industrial and utility applications, bomb shelters, fire walls, breaks, as veneer stone, retaining wall stone, including stone caps, concrete masonry units (CMU), seawall blocks, concrete floor, or any other known applications, including any other known type of residential, commercial and industrial structures.

The cementitious mixes of the present invention may be used for structural beams, such as precast and pre-stressed beams and beams of any shape. For instance, the structural beams may include rectangular beams, inverted tee ("T") beams, L-beams, and the like. Additionally, the following examples may be used to produce columns, raker beams, and any other known type of structural concrete-based beam.

The present invention recognizes that the use of silica, including glass, in concrete may cause an alkali-silica reaction (ASR). ASR may occur over time in concrete between highly alkaline cement and reactive amorphous (e.g., non-crystalline) silica, which may be found in common aggregates. ASR may form cracks in an outer surface of the concrete to a depth sufficient to reach rebar embedded in the concrete, for example, 2 inches. Once the rebar is exposed to the atmosphere, it begins to rust (i.e., form iron oxide). With an increasing formation of rust on the rebar, there is an increase in separation between the rebar and the surrounding concrete. This separation between the rebar and the surrounding concrete causes additional cracks to form and may eventually lead to concrete failure. In order to minimize and/or eliminate ASR, the present invention utilizes fly ash and/or bottom ash to reduce and/or eliminate the reactivity of the silica.

For each of the following examples, where polyethylene and plastic are used in a particular example, plastic does not encompass the polyethylene. That is, plastic is referring to plastics other than polyethylene when both plastic and polyethylene are listed as a component of a particular example.

The percentages listed in the following examples are in weight percentage (wt %), as compared to the total dry weight. The total dry weight being the water of the composition with all of the dry materials being mixed and prior to water being added to the mixture. Further, in the Examples below, stone or equivalents may be "coarse aggregate," as known in the art, which may include gravel, crushed stone or recycled concrete with particle sizes of ranging from ⅜-inch to 1.5 inches. Further, air % refers to air entrainment, which is the intentional creation of tiny air bubbles in concrete. Air may be added using an air entraining agent and a surfactant as known in the art.

Further, the "wt %" in Examples 1-49 below represents a percentage of weight of the respective composition with regard to the total dry weight.

The following Example 1 includes a composition of a cementitious mix according to an embodiment of the present invention:

Example 1

Polyethylene=3 oz, 0.17 wt %
Tire Chips=4 lbs, 3.72 wt %
Cement Type I/II=21.1 lbs, 19.65 wt %
Fly Ash/Bottom Ash=54.5 lbs, 50.75 wt %
Sand=27.6 lbs, 25.70 wt %
Water=20.9 lbs, 2.5 gallons,
Total Dry Weight=107 lbs The following Example 2 includes a composition of a cementitious mix according to an embodiment of the present invention:

Example 2

Polyethylene=3 oz, 0.15 wt %
Cement Type I/II=21.1 lbs, 17.08 wt %
Fly Ash/Bottom Ash=54.5 lbs, 44.12 wt %
Sand=27.6 lbs, 22.34 wt %
Foundry Sand=20.14 lbs, 16.30 wt %
Water=20.9 lbs, 2.5 gallons
Total Dry Weight=123.53 lbs The following Example 3 includes a composition of a cementitious mix according to an embodiment of the present invention:

Example 3

Polyethylene=1.1 lbs, 0.6 wt %
Cement Type I/II=41.06 lbs, 22 wt %
Fly Ash/Bottom Ash=30 lbs, 16.2 wt %
Sand=64.2 lbs, 35 wt %
Foundry Sand=48.3 lbs, 26.1 wt %
Water=29.2 lbs, 3.5 gallons
Total Dry Weight=184.66 lbs The following Example 4 includes a composition of a cementitious mix according to an embodiment of the present invention:

Example 4

Polyethylene=0.23 lbs, 0.10 wt %
Cement Type I/II=65.6 lbs, 28.6 wt %
Fly Ash/Bottom Ash=30 lbs, 13 wt %

Sand=85.6 lbs, 37.3 wt %
Foundry Sand=48.3 lbs, 21 wt %
Water=25 lbs, 3 gallons
Total Dry Weight=229.5 lbs The following Example 5 includes a composition of a cementitious mix according to an embodiment of the present invention:

Example 5

Cement Type I/II=50 lbs, 24.7 wt %
Fly Ash/Bottom Ash=30 lbs, 14.8 wt %
Sand=65 lbs, 32.2 wt %
Foundry Sand=50 lbs, 24.7 wt %
Plastic=3 lbs, 1.5 wt %
Glass=4 lbs, 2 wt %
Polyethylene=0.2 lbs (3 oz), 0.10 wt %
Water=33.4 lbs, 4 gallons
Total Dry Weight=202.2 lbs Test #1 of Example 5, Concrete Beam, Tested Per ASTM C78, C511, C617

| Age (days) | Average Width (in) | Average Depth (in) | Span Length (in) | Total Load (lbs) | Modulus of Rupture (psi) |
|---|---|---|---|---|---|
| 90 | 6.15 | 6.12 | 18 | 12,250 | 965 |

Test #2 of Example 5, Concrete Beam, Tested Per ASTM C78, C511, C617

| Age (days) | Average Width (in) | Average Depth (in) | Span Length (in) | Total Load (lbs) | Modulus of Rupture (psi) |
|---|---|---|---|---|---|
| 90 | 6.07 | 6.06 | 18 | 19,560 | 1590 |

Test #3 of Example 5, Concrete Cylinder, Tested Per ASTM C39. C511/C1231

| Age (days) | Cylinder Diameter (in) | Area (in²) | Fracture type (1-6) | Total Load (lbs) | Unit Load (psi) |
|---|---|---|---|---|---|
| 82 | 4 | 12.57 | 5 | 55,690 | 4,430 |

The following Example 6 includes a composition of a cementitious mix according to an embodiment of the present invention:

Example 6

Cement Type I/II=15 lbs, 27.8 wt %
Fly Ash/Bottom Ash=5 lbs, 9.24 wt %
Sand=10 lbs, 18.5 wt %
Foundry Sand=10 lbs, 18.5 wt %
Plastic=3 lbs, 5.5 wt %
Glass=1 lbs, 1.85 wt %
Polyethylene=0.1 lbs (1.6 oz), 0.185 wt %
Stones/Recycled Crushed Brick=10 lbs, 18.5 wt %

Water=8.3 lbs, 1 gallon

Total Dry Weight=54.1 lbs

The following Example 7 includes a composition of a cementitious mix according to an embodiment of the present invention:

Example 7

Cement Type VII=30 lbs, 21.52 wt %

Fly Ash/Bottom Ash=25 lbs, 17.93 wt %

Sand (e.g., ⅜ minus type)=60 lbs, 43.05 wt %

Foundry Sand=20 lbs, 14.35 wt %

Plastic=3 lbs, 2.15 wt %

Polyethylene Strips=0.375 lbs (6 oz), 0.27 wt %

Silica Fume=1 lb, 0.72 wt %

Water=22.5 lbs, 2.7 gallons

Total Dry Weight=139.4 lbs

The following Example 8 includes a composition of a cementitious mix according to an embodiment of the present invention:

Example 8

Cement Type I/11=50 lbs, 24 wt %

Fly Ash/Bottom Ash=30 lbs, 14.3 wt %

Sand=65 lbs, 30 wt %

Foundry Sand=50 lbs, 23.71 wt %

Plastic=3 lbs, 1.42 wt %

Glass=4 lbs, 1.89 wt %

Polyethylene=0.1875 lbs (3 oz), 0.41 wt %

Silica Fume=8 lb, 3.8 wt %

Water=33.4 lbs, 4.0 gallons

Total Dry Weight=210.2 lbs

The following Example 9 includes a composition of a cementitious mix according to an embodiment of the present invention:

Example 9

Cement Type I/II=45 lbs, 21.7 wt %

Fly Ash/Bottom Ash=30 lbs, 14.6 wt %

Sand=64 lbs, 30.8 wt %

Foundry Sand=48 lbs, 23.1 wt %

Plastic=5 lbs, 2.4 wt %

Glass=4 lbs, 1.9 wt %

Polyethylene=0.1245 lbs (2 oz), 0.6 wt %

Carboard/Paper=1.5 lbs, 0.7 wt %

Silica Fume=10 lbs, 4.8 wt %

Water=33.4 lbs, 4.0 gallons

Total Dry Weight=207.5 lbs

The following Example 10 includes a composition of a cementitious mix according to an embodiment of the present invention:

Example 10

Cement Type III=630 lbs, 18.6 wt %

Fly Ash/Bottom Ash=100 lbs, 2.95 wt %

Sand=1453 lbs, 42.9 wt %

Stone/Coarse Aggregate=1000 lbs, 29.5 wt %

Plastic=125 lbs, 3.7 wt %

Slag=70 lbs, 2.06 wt %

Polyethylene=11 lbs, 0.3 wt %

Water Reducer=22-28 oz/yd

Air Entrainment—As needed

Water=320 lbs, 38.34 gallons

Total Dry Weight=3,389 lbs

The polyethylene in Example 10 is in the form of strips.

Test of Example 10

| Plastic Air % | Slump (in) | Mix Temp (° F.) | Unit Weight (lbs) | 1-Day psi (compressive strength) | 7-Day psi (compressive strength) | 14-Day psi (compressive strength) | 28-Day psi (compressive strength) |
|---|---|---|---|---|---|---|---|
| 4.7 | 2.5 | 65 | 136.8 | 2390 | 3980 | 4140 | 4380 |

The following Example 11 includes a composition of a cementitious mix according to an embodiment of the present invention:

Example 11

Cement Type I/II=50 lbs, 24.58 wt %

Fly Ash/Bottom Ash=30 lbs, 14.75 wt %

Sand=65 lbs, 31.96 wt %

Foundry Sand=50 lbs, 24.58 wt %

Plastic=3 lbs, 1.48 wt %

Glass=4 lbs, 1.97 wt %

Basalt (e.g. basalt staples)=3 oz, 0.092 wt %

Plasticizer=3 oz, 0.092 wt %

Silica Fume=1 lb, 0.49 wt %

Water=29.19 lbs, 3.5 gallons

Total Dry Weight=203.375 lbs

The following Example 12 includes a composition of a cementitious mix according to an embodiment of the present invention:

Example 12

Cement Type III=630 lbs, 18.65 wt %

Fly Ash/Bottom Ash=100 lbs, 2.96 wt %

Sand=1453 lbs, 43.01 wt %

Slag=70 lbs, 2.07 wt %

Stone/Coarse Aggregate=1000 lbs, 29.6 wt %

Plastic=125 lbs, 3.7 wt %

Water Reducer=22-28 oz/yd

Water=320 lbs, 38.34 gallons

Air Entrainment—as needed

Total Dry Weight=3378 lbs

Test of Example 12

| Plastic Air % | Slump (in) | Mix Temp (° F.) | Unit Weight (lbs) | 1-Day psi (compressive strength) | 7-Day psi (compressive strength) | 14-Day psi (compressive strength) | 28-Day psi (compressive strength) |
|---|---|---|---|---|---|---|---|
| 4.4 | 8.75 | 65 | 136.3 | 3580 | 5490 | 5770 | 6050 |

The following Example 13 includes a composition of a cementitious mix according to an embodiment of the present invention:

Example 13

Cement Type III=630 lbs, 18.59 wt %
Fly Ash/Bottom Ash=100 lbs, 2.95 wt %
Sand=1453 lbs, 42.9 wt %
Slag=70 lbs, 2.06 wt %
Stone/Coarse Aggregate=1000 lbs, 29.5 wt %
Plastic=125 lbs, 3.7 wt %
Polyethylene, 0.006 mil=11 lbs, 0.32 wt %
Water Reducer=22-28 oz/yd
Water=320 lbs, 38.34 gallons
Air Entrainment—as needed
Total Dry Weight=3,414 lbs Test of Example 13

| Plastic Air % | Slump (in) | Mix Temp (° F.) | Unit Weight (lbs) | 1-Day psi (compressive strength) | 7-Day psi (compressive strength) | 14-Day psi (compressive strength) | 28-Day psi (compressive strength) |
|---|---|---|---|---|---|---|---|
| 3 | 8.25 | 73 | 137.6 | 2230 | 3760 | 3820 | 3880 |

The following Example 14 includes a composition of a cementitious mix according to an embodiment of the present invention:

Example 14

Cement Type III=630 lbs, 18.5 wt %
Fly Ash/Bottom Ash=100 lbs, 2.9 wt %
Sand=1453 lbs, 42.7 wt %
Slag=70 lbs, 2.05 wt %
Stone/Coarse Aggregate=1000 lbs, 29.4 wt %
Cordierite=25 lbs, 0.73 wt %
Plastic=125 lbs, 3.7 wt %
Water Reducer=22-28 oz/yd
Water=320 lbs, 38.34 gallons
Air Entrainment—as needed
Total Dry Weight=3,403 lbs Test of Example 14

| Plastic Air % | Slump (in) | Mix Temp (° F.) | Unit Weight (lbs) | 1-Day psi (compressive strength) | 7-Day psi (compressive strength) | 14-Day psi (compressive strength) | 28-Day psi (compressive strength) |
|---|---|---|---|---|---|---|---|
| 3.2 | 10.5 | 69 | 136.7 | 1670 | 3220 | 3580 | 3780 |

The following Example 15 includes a composition of a cementitious mix according to an embodiment of the present invention:

Example 15

Cement Type III=560 lbs, 15.4 wt %
Fly Ash/Bottom Ash=130 lbs, 3.6 wt %
Sand=1453 lbs, 39.9 wt %
Slag=140 lbs, 3.8 wt %
Stone/Coarse Aggregate=1000 lbs, 2.7 wt %
Plastic=150 lbs, 4.1 wt %
Polyethylene, 0.006 mil=11 lbs, 0.3 wt %
Asphalt Millings=200 lbs, 5.5 wt %
Water Reducer=22-28 oz/yd
Water=320 lbs, 38.34 gallons
Air Entrainment—as needed
Total Dry Weight=3,644 lbs Test of Example 15

| Plastic Air % | Slump (in) | Mix Temp (° F.) | Unit Weight (lbs) | 7-Day psi (compressive strength) | 28-Day-psi (compressive strength) | 56-Day -psi (compressive strength) |
|---|---|---|---|---|---|---|
| 4.7 | 8.25 | 72 | 134.6 | 4650 | 5370 | 5610 |

The following Example 16 includes a composition of a cementitious mix according to an embodiment of the present invention:

Example 16

Cement Type III=430 lbs, 12.3 wt %
Fly Ash/Bottom Ash=140 lbs, 4.03 wt %

Sand=1453 lbs, 41.8 wt %
Slag=140 lbs, 4.03 wt %
Stone/Coarse Aggregate=900 lbs 25.9 wt %
Plastic=160 lbs, 4.6 wt %
Polyethylene, 0.006 mil=11 lbs, 0.32 wt %
Blacktop/Asphalt Millings=240 lbs, 6.9 wt %
Water Reducer=22-28 oz/yd
Water=280 lbs, 38.55 gallons
Water/Cementitious material=0.39 weight ratio
Cementitious material=cement, fly ash/bottom ash
Air Entrainment—as needed
Total Dry Weight=3,474 lbs

Test of Example 16

| Plastic Air % | Slump (in) | Mix Temp (° F.) | Unit Weight (lbs) | 1-Day psi (compressive strength) | 7-Day psi (compressive strength) | 28-Day psi (compressive strength) | 56-Day psi (compressive strength) |
|---|---|---|---|---|---|---|---|
| 3 | 7 | 72 | 137.6 | 2580 | 4810 | 5170 | 5830 |

The following Example 17 includes a composition of a cementitious mix according to an embodiment of the present invention:

Example 17

Cement Type III=430 lbs, 14.2 wt %
Fly Ash=80 lbs, 2.65 wt %
Bottom Ash=155 lbs, 5.13 wt %
Sand=1453 lbs, 48.05 wt %
Slag=140 lbs, 4.63 wt %
Stone/Coarse Aggregate=600 lbs, 19.85 wt %
Plastic=160 lbs, 5.3 wt %
Polyethylene, 0.006 mil=5.5 lbs, 0.18 wt %
Water Reducer=22-28 oz/yd
Water=201 lbs, 24.1 gallons
Air Entrainment—as needed
Water/Cementitious material=0.4 weight ratio
Total Dry Weight=3,023.5 lbs The following Example 18 includes a composition of a cementitious mix according to an embodiment of the present invention:

Example 18

Cement Type III=430 lbs, 14.2 wt %
Fly Ash=80 lbs, 2.65 wt %
Bottom Ash=155 lbs, 5.12 wt %
Sand=1453 lbs, 48.05 wt %
Slag=140 lbs, 4.63 wt %
Stone/Coarse Aggregate=600 lbs, 19.84 wt %
Plastic=160 lbs, 5.29 wt %
Polyethylene, 0.006 mil=5.5 lbs, 0.18 wt %
Water Reducer=22-28 oz/yd
Water=259 lbs, 31 gallons
Air Entrainment—as needed
Water/Cementitious material=0.4 weight ratio
Cementitious material=cement, fly ash, bottom ash, silica fume
Total Dry Weight=3,023.5 lbs

Test of Example 18

| Plastic Air % | Slump (in) | Mix Temp (° F.) | Unit Weight (lbs) | 1-Day psi (compressive strength) | 7-Day psi (compressive strength) | 28-Day psi (compressive strength) |
|---|---|---|---|---|---|---|
| 11.5 | 7 | 70 | 125.1 | 2600 | 4020 | 4460 |

The following Example 19 includes a composition of a cementitious mix according to an embodiment of the present invention:

Example 19

Cement Type III=430 lbs, 14.2 wt %
Fly Ash=80 lbs, 2.64 wt %
Bottom Ash=155 lbs, 5.13 wt %
Sand=1453 lbs, 48.05 wt %
Slag=140 lbs, 4.63 wt %,
Stone/Coarse Aggregate=600 lbs, 19.84 wt %
Plastic=160 lbs, 5.29 wt %
Polyethylene, 0.006 mil=5.5 lbs, 0.18 wt %
Water Reducer=45 oz
Water=259 lbs, 31 gallons
Air Entrainment—as needed
Water/Cementitious material=0.4 weight ratio
Cementitious material=cement, fly ash, bottom ash
Total Dry Weight=3,023.5 lbs

Test of Example 19

| Plastic Air % | Slump (in) | Mix Temp (° F.) | Unit Weight (lbs) | 1-Day psi (compressive strength) | 7-Day psi (compressive strength) | 28-Day psi (compressive strength) |
|---|---|---|---|---|---|---|
| 4.7 | 8.5 | 69 | 132.6 | 3060 | 4970 | 6200 |

The following Example 20 includes a composition of a cementitious mix according to an embodiment of the present invention:

Example 20

Cement Type III=366 lbs, 12.3 wt %
Fly Ash=80 lbs, 2.69 wt %
Bottom Ash=161 lbs, 5.43 wt %
Sand=1453 lbs, 48.99 wt %
Slag=140 lbs, 4.72 wt %
Stone/Coarse Aggregate=600 lbs, 20.23 wt %
Plastic=160 lbs, 5.39 wt %
Polyethylene, 0.006 mil=5.5 lbs, 0.185 wt %
Water Reducer=45 oz
Water=259 lbs, 31 gallons
Air Entrainment—as needed Water/Cementitious material=0.43 weight ratio
Cementitious material=cement, fly ash, bottom ash
Total Dry Weight=2,965.5 lbs Test of Example 20

| Plastic Air % | Slump (in) | Mix Temp (° F.) | Unit Weight (lbs) | 1-Day psi (compressive strength) | 7-Day psi (compressive strength) | 28-Day psi (compressive strength) |
|---|---|---|---|---|---|---|
| 5.3 | 9.25 | 68 | 129.4 | 1590 | 3200 | 3740 |

The following Example 21 includes a composition of a cementitious mix according to an embodiment of the present invention:

Example 21

Cement Type III=366 lbs, 12.36 wt %
Fly Ash=80 lbs, 2.7 wt %
Bottom Ash=161 lbs, 5.4 wt %
Sand=1453 lbs, 49.09 wt %
Slag=140 lbs, 4.73 wt %
Stone/Coarse Aggregate=600 lbs, 20.27 wt %
Plastic=160 lbs, 5.4 wt %
Water Reducer=45 oz
Water=259 lbs, 31 gallons
Air Entrainment—as needed
Water/Cementitious material=0.43 weight ratio
Cementitious material=cement, fly ash, bottom ash
Total Dry Weight=2,960 lbs Test of Example 21

| Plastic Air % | Slump (in) | Mix Temp (° F.) | Unit Weight (lbs) | 1-Day psi (compressive strength) | 7-Day psi (compressive strength) | 28-Day psi (compressive strength) |
|---|---|---|---|---|---|---|
| 6.1 | 9.25 | 68 | 130 | 2190 | 4340 | 4990 |

The following Example 22 includes a composition of a cementitious mix according to an embodiment of the present invention:

Example 22

Cement Type III=370 lbs, 10.73 wt %
Fly Ash=160 lbs, 4.64 wt %
Sand=1453 lbs, 42.13 wt %
Slag=140 lbs, 4.06 wt %
Stone/Coarse Aggregate=600 lbs, 17.4 wt %
Plastic=160 lbs, 4.64 wt %
Polyethylene=5.5 lbs, 0.159 wt %
Asphalt Millings: 280 lbs, 8.12 wt %
Quarry Dust Powder=280 lbs, 8.12 wt %
Water Reducer=22 to 28 oz/yd Water=280 lbs, 33.55 gallons
Air Entrainment—as needed
Water/Cementitious material=0.4 weight ratio
Cementitious material=cement, fly ash, quarry dust powder
Total Dry Weight=3,448.5 lbs Test of Example 22

| Plastic Air % | Slump (in) | Mix Temp (° F.) | Unit Weight (lbs) | 1-Day psi (compressive strength) | 7-Day psi (compressive strength) | 28-Day psi (compressive strength) |
|---|---|---|---|---|---|---|
| 7.6 | 6 | 67 | 126.2 | 1630 | 3190 | 3880 |

The disclosure of which described above is not limited to the materials and features described therein, and may be changed within the scope of one ordinary skill in the art.

The following Example 23 includes a composition of a cementitious mix according to an embodiment of the present invention:

Example 23

Cement Type III=800 lbs, 22.44 wt %
Fly Ash=160 lbs, 4.49 wt %
Sand=1500 lbs, 9.1 volume, 42.08 wt %
Slag=80 lbs, 2.24 wt %
Stone/Coarse Aggregate=900 lbs, 25.25 wt %
Plastic=125 lbs, 3.51 wt %
Water Reducer=42 oz/yd
Water=320 lbs, 38.34 gallons
Air Entrainment—as needed
Water/Cementitious material=0.4 weight ratio
Cementitious material=cement, fly ash, quarry dust powder
Total Dry Weight=3,565 lbs Test of Example 23—ASTM: C31, C128, C172, C231, C1064, Compressive Strength Data: ASTM C31. C39

| Plastic Air % | Slump (in) | Mix Temp (° F.) | Unit Weight (lbs) | Air Temp(° F.) | 1-Day psi (compressive strength) | 7-Day psi (compressive strength) | 14-Day psi (compressive strength) | 28-Day psi (compressive strength) |
|---|---|---|---|---|---|---|---|---|
| 4 | 6.75 | 74 | 137.2 | 67 | 4690 | 6760 | 7240 | 7640 |

The following Example 24 includes a composition of a cementitious mix according to an embodiment of the present invention:

Example 24

Cement Type III=800 lbs, 22.13 wt %
Stone/Coarse Aggregate=900 lbs, 24.89 wt %
Sand=1500 lbs, 41.49 wt %
Water=350 lbs, 41.93 gallons
Cordierite=80 lbs, 2.21 wt %
Fly Ash=160 lbs, 4.42 wt %

Silica Fume=50 lbs, 1.38 wt %
Plastic=125 lbs, 3.45 wt %
Air Entrainment—as needed
Cementitious material=cement, fly ash, quarry dust powder
Total Dry Weight=3,448.5 lbs Test of Example 24—ASTM: C31, C128, C172,
C231, C1064, Compressive Strength Data: ASTM
C31, C39

| Plastic Air % | Slump (in) | Mix Temp (° F.) | Unit Weight (lbs) | Air Temp(° F.) | 1-Day psi (compressive strength) | 7-Day psi (compressive strength) | 14-Day psi (compressive strength) | 28-Day psi (compressive strength) |
|---|---|---|---|---|---|---|---|---|
| 3.4 | 8 | 76 | 137.8 | 67 | 4610 | 6840 | 7260 | 8030 |

The following Example 25 includes a composition of a cementitious mix according to an embodiment of the present invention:

Example 25

Cement Type III=800 lbs, 22.66 wt %
Stone/Coarse Aggregate=900 lbs, 25.49 wt %
Sand=1420 lbs, 40.22 wt %
Water=320 lbs, 38.34 gallons
Fly Ash=160 lbs, 4.53 wt %

Silica Fume=50 lbs, 1.42 wt %
Plastic=100 lbs, 2.83 wt %
Rubber (tire chips)=100 lbs, 2.83 wt %
Water Reducer=42 oz
Air Entrainment—as needed
Total Dry Weight=3,530 lbs Test of Example 25—ASTM: C31, C138, C172,
C231, C1064, Compressive Strength Data: ASTM
C31 and ASTM C39

| Plastic Air % | Slump (in) | Mix Temp (° F.) | Unit Weight (lbs) | Air Temp (° F.) | 1-Day psi (compressive strength) | 7-Day psi (compressive strength) | 14-Day psi (compressive strength) | 28-Day psi (compressive strength) |
|---|---|---|---|---|---|---|---|---|
| 3.2 | 8 | 71 | 132.8 | 64 | 3180 | 4450 | 4530 | 4610 |

The following Example 26 includes a composition of a cementitious mix according to an embodiment of the present invention:

Example 26

Cement Type III=800 lbs, 22.66 wt %
Stone/Coarse Aggregate=900 lbs, 25.49 wt %
Sand=1420 lbs, 40.22 wt %
Water=320 lbs, 38.34 gallons
Fly Ash=160 lbs, 4.53 wt %
Silica Fume=50 lbs, 1.41 wt %
Plastic=140 lbs, 3.96 wt %
Rubber (tire chips)=60 lbs, 1.69 wt %
Water Reducer=42 oz
Air Entrainment—as needed
Total Dry Weight=3,530 lbs Test of Example 26—ASTM: C31, C138, C172,
C231, C1064, Compressive Strength Data: ASTM
C31 and ASTM C39

| Plastic Air % | Slump (in) | Mix Temp (° F.) | Unit Weight (lbs) | Air Temp (° F.) | 1-Day psi (compressive strength) | 7-Day psi (compressive strength) | 14-Day psi (compressive strength) |
|---|---|---|---|---|---|---|---|
| 2.5 | 6.25 | 72 | 132.8 | 67 | 3580 | 4450 | 4530 |

The following Example 27 includes a composition of a cementitious mix according to an embodiment of the present invention:

Example 27

Cement Type III=800 lbs, 22.66 wt %
Stone/Coarse Aggregate=900 lbs, 25.49 wt %
Sand=1420 lbs, 40.22 wt %
Water=345 lbs, 41.34 gallons
Fly Ash=160 lbs, 4.53 wt %
Silica Fume=50 lbs, 1.41 wt %
Plastic=100 lbs, 2.83 wt %
Rubber (tire chips)=100 lbs, 1.69 wt %
Water Reducer=42 oz
Air Entrainment—as needed
Total Dry Weight=3,530 lbs Test of Example 27—ASTM: C31, C138, C172, C231, C1064, Compressive Strength Data: ASTM C31 and ASTM C39

| Plastic Air % | Slump (in) | Mix Temp (° F.) | Unit Weight (lbs) | Air Temp (° F.) | 1-Day psi (compressive strength) | 7-Day psi (compressive strength) | 14-Day psi (compressive strength) |
|---|---|---|---|---|---|---|---|
| 4.8 | 6.5 | 74 | 129.2 | 67 | 3020 | 3820 | 3900 |

The following Example 28 includes a composition of a cementitious mix according to an embodiment of the present invention:

Example 28

Cement Type III=800 lbs, 22.98 wt %
Stone/Coarse Aggregate=780 lbs, 22.41 wt %
Sand=1400 lbs, 40.22 wt %
Water=354 lbs, 42.41 gallons
Fly Ash=160 lbs, 4.59 wt %
Silica Fume=50 lbs, 1.43 wt %
Plastic=140 lbs, 4.02 wt %
Bottom Ash=150 lbs, 4.31 wt %
Water Reducer=58 oz
Air Entrainment—as needed
Total Dry Weight=3,480 lbs Test of Example 28—ASTM: C31, C138, C172, C231, C1064, Compressive Strength Data: ASTM C31 and ASTM C39

| Plastic Air % | Slump (in) | Mix Temp (° F.) | Unit Weight (lbs) | Air Temp (° F.) | 1-Day psi (compressive strength) | 7-Day psi (compressive strength) |
|---|---|---|---|---|---|---|
| 4.2 | 8.75 | 77 | 131.4 | 59 | 3580 | 5170 |

The following Example 29 includes a composition of a cementitious mix according to an embodiment of the present invention:

Example 29

Cement Type III=800 lbs, 22.66 wt %
Stone/Coarse Aggregate=810 lbs, 25.49 wt %

Sand=1400 lbs, 40.22 wt %
Water=354 lbs, 42.41 gallons
Fly Ash=160 lbs, 4.53 wt %
Silica Fume=50 lbs, 1.41 wt %
Plastic=130 lbs, 3.96 wt %
Cordierite=150 lbs., 4.28 wt %
Water Reducer=58 oz
Air Entrainment—as needed
Total Dry Weight=3,500 lbs Test of Example 29—ASTM: C31, C138, C172, C231, C1064, Compressive Strength Data: ASTM C31 and ASTM C39

| Plastic Air % | Slump (in) | Mix Temp (° F.) | Unit Weight (lbs) | Air Temp (° F.) | 1-Day psi (compressive strength) | 7-Day psi (compressive strength) |
|---|---|---|---|---|---|---|
| 5.1 | 5.5 | 77 | 131.8 | 59 | 3900 | 5650 |

The following Example 30 includes a composition of a cementitious mix according to an embodiment of the present invention:

Example 30

Cement Type III=800 lbs, 23.46 wt %
Stone/Coarse Aggregate=750 lbs, 21.99 wt %
Sand=1350 lbs, 39.58 wt %
Fly Ash=60 lbs, 1.75 wt %
Silica Fume=50 lbs, 1.46 wt %
Plastic=150 lbs, 4.39 wt %
Cordierite 150 lbs, 4.39 wt %
Bottom Ash=100 lbs, 2.93 wt %
Water=345 lbs, 41.34 gallons
Water Reducer=58 oz
Air Entrainment—as needed
Total Dry Weight=3,410 lbs Test of Example 30—ASTM: C31, C138, C172, C231, C1064, Compressive Strength Data: ASTM C31 and ASTM C39

| Plastic Air % | Slump (in) | Mix Temp (° F.) | Unit Weight (lbs) | Air Temp (° F.) | 1-Day psi (compressive strength) | 7-Day psi (compressive strength) |
|---|---|---|---|---|---|---|
| 5.5 | 8.25 | 73 | 129.9 | 61 | 3340 | 5010 |

The following Example 31 includes a composition of a cementitious mix according to an embodiment of the present invention:

Example 31

Cement Type III=800 lbs, 22.85 wt %
Stone/Coarse Aggregate=810 lbs, 23.14 wt %
Sand=1400 lbs, 40 wt %
Slag=80 lbs, 2.28 wt %
Silica Fume=50 lbs, 1.42 wt %
Plastic=130 lbs, 3.71 wt %
Cordierite=150 lbs, 4.28 wt %
Bottom Ash=80 lbs, 2.28 wt %
Water Reducer=58 oz
Water=345 lbs, 41.34 gallons
Air Entrainment—as needed
Total Dry Weight=3,500 lbs Test of Example 31—ASTM: C31, C138, C172, C231, C1064, Compressive Strength Data: ASTM C31 and ASTM C39

| Plastic Air % | Slump (in) | Mix Temp (° F.) | Unit Weight (lbs) | Air Temp (° F.) | 1-Day psi (compressive strength) | 7-Day psi (compressive strength) |
|---|---|---|---|---|---|---|
| 5.7 | 6.75 | 74 | 131.1 | 74 | 3660 | 5170 |

The following Example 32 includes a composition of a cementitious mix according to an embodiment of the present invention:

Example 32

Sand=1400 lbs, 41.05 wt %
Limestone/Coarse Aggregate=620 lbs, 18.18 wt %
Cement Type III=430 lbs, 12.60 wt %
Slag=70 lbs, 2.05 wt %
Fly Ash=120 lbs, 3.51 wt %
Quarry Dust Powder (QDP)=220 lbs, 6.45 wt %
Stone ¾ minus=220 lbs, 6.45 wt %
Silica Fume=30 lbs, 0.87 wt %
Plastic=300 lbs, 8.79 wt %
Water Reducer=74 oz
Water=260 lbs, 31.15 gallons
Air Entrainment—as needed
Total Dry Weight=3,410 lbs Test of Example 32—ASTM: C31, C138, C172, C231, C1064, Compressive Strength Data: ASTM C31 and ASTM C39

| Plastic Air % | Slump (in) | Mix Temp (° F.) | Unit Weight (lbs) | 1-Day psi (compressive strength) | 7-Day psi (compressive strength) | 28-Day psi (compressive strength) | 56-Day psi (compressive strength) |
|---|---|---|---|---|---|---|---|
| 3.4 | 21 | 61 | 133.7 | 2230 | 3260 | 3780 | 4220 |

The following Example 33 includes a composition of a cementitious mix according to an embodiment of the present invention:

Example 33

Sand=1400 lbs, 41.05 wt %
Limestone/Coarse Aggregate=620 lbs, 18.18 wt %
Cement Type III=430 lbs, 12.60 wt %
Slag=70 lbs, 2.05 wt %
Fly Ash=120 lbs, 3.51 wt %
Quarry Dust Powder=220 lbs, 6.45 wt %
Stone ¾ minus=220 lbs, 6.45 wt %
Silica Fume=30 lbs, 0.87 wt %
Plastic=300 lbs, 8.79 wt %
Water Reducer=45 oz
Water=285 lbs, 34.15 gallons
Air Entrainment—as needed
Total Dry Weight=3,410 lbs Test of Example 33—ASTM: C31, C138, C172, C231, C1064, Compressive Strength Data: ASTM C31 and ASTM C39

| Plastic Air % | Slump (in) | Mix Temp (° F.) | Unit Weight (lbs) | 1-Day psi (compressive strength) | 7-Day psi (compressive strength) | 28-Day psi (compressive strength) | 56-Day psi (compressive strength) |
|---|---|---|---|---|---|---|---|
| 7.6 | 18 | 62 | 128.2 | 2030 | 3060 | 3660 | 4060 |

The following Example 34 includes a composition of a cementitious mix according to an embodiment of the present invention:

Example 34

Quarry Dust Powder and ⅜ minus Sand Blend=800 lbs, 28.46 wt %
Stone ¾ Minus=1000, 35.58 wt %
Cement Type III=480 lbs, 17.08 wt %
Fly Ash=140 lbs, 4.98 wt %
Slag=60 lbs, 2.13 wt %
Plastic=300 lbs, 10.67 wt %
Silica Fume=30 lbs, 1.06 wt %
Water Reducer=45 oz
Water=284 lbs, 34.03 gallons
Air Entrainment—as needed
Total Dry Weight=2810 lbs Test of Example 34—ASTM: C31, C138, C172, C231, C1064, Compressive Strength Data: ASTM C31 and ASTM C39

| Plastic Air % | Slump (in) | Mix Temp (° F.) | Unit Weight (lbs) | 1-Day psi (compressive strength) | 7-Day psi (compressive strength) | 28-Day psi (compressive strength) |
|---|---|---|---|---|---|---|
| 3.4 | 21 | 81 | 133.7 | 2630 | 3580 | 4100 |

The following Example 35 includes a composition of a cementitious mix according to an embodiment of the present invention:

Example 35

Cement Type III=480 lbs, 21.42 wt %

Slag=70 lbs, 3.12 wt %

Fly Ash=120 lbs, 5.35 wt %

Quarry Dust Powder and ⅜ minus Sand Blend=520 lbs, 23.21 wt %

Stone ¾ minus=720 lbs, 32.14 wt %

Silica Fume=30 lbs 1.33 wt %

Plastic=300 lbs, 13.39 wt %

Water Reducer=52 oz

Water=300 lbs, 34.03 gallons

Air Entrainment—as needed

Total Dry Weight=2240 lbs

Test of Example 35—ASTM: C31, C138, C172, C231, C1064, Compressive Strength Data: ASTM C31 and ASTM C39

| Plastic Air % | Slump (in) | Mix Temp (° F.) | Unit Weight (lbs) | 1-Day psi (compressive strength) | 7-Day psi (compressive strength) | 28-Day psi (compressive strength) | 56-Day psi (compressive strength) |
|---|---|---|---|---|---|---|---|
| 3.3 | 23 | 82 | 121.5 | 1910 | 2510 | 3740 | 4300 |

The following Example 36 includes a composition of a cementitious mix according to an embodiment of the present invention:

Example 36

Cement=520 lbs, 17.04 wt %
Slag=70 lbs, 2.29 wt %
Fly Ash 140 lbs, 4.59 wt %
Quarry Dust Powder and ⅜ minus Sand Blend=1140 lbs, 37.37 wt %
Stone ¾ minus=840 lbs, 27.54 wt %
Silica Fume=40 lbs, 1.31 wt %
Plastic=300 lbs, 9.83 wt %
Water Reducer=72 oz
Water=340 lbs, 40.74 gallons
Air Entrainment—as needed
Total Dry Weight=3050 lbs Test of Example 36—ASTM: C31, C138, C172, C231, C1064, Compressive Strength Data: ASTM C31 and ASTM C39

| Plastic Air % | Slump (in) | Mix Temp (° F.) | Unit Weight (lbs) | 1-Day psi (compressive strength) | 7-Day psi (compressive strength) | 28-Day psi (compressive strength) | 56-Day psi (compressive strength) |
|---|---|---|---|---|---|---|---|
| 3.7 | 20 | 76 | 131.3 | 2630 | 3420 | 4380 | 4690 |

The following Example 37 includes a composition of a cementitious mix according to an embodiment of the present invention:

Example 37

5

Cement Type III=520 lbs, 17.04 wt %
Slag=70 lbs, 2.29 wt %
Fly Ash=140 lbs, 4.59 wt %
Quarry Dust Powder ⅜ minus=1140 lbs, 37.37 wt %        10
Stone ¾ minus=840 lbs, 27.54 wt %
Silica Fume=40 lbs, 1.31 wt %
Plastic=300 lbs, 9.83 wt %
Water Reducer=61 oz
Water=340 lbs, 40.74 gallons                           15
Air Entrainment—as needed
Total Dry Weight=3050 lbs Test of Example 37—ASTM: C31, C138, C172,
C231, C1064, Compressive Strength Data: ASTM
C31 and ASTM C39

| Plastic Air % | Slump (in) | Mix Temp (° F.) | Unit Weight (lbs) | 1-Day psi (compressive strength) | 7-Day psi (compressive strength) | 28-Day psi (compressive strength) | 56-Day psi (compressive strength) |
|---|---|---|---|---|---|---|---|
| 3 | 22 | 78 | 132.5 | 2310 | 3380 | 3740 | 4530 |

The following Example 38 includes a composition of a cementitious mix according to an embodiment of the present invention:

30

Example 38

35

Cement Type III=520 lbs, 17.50 wt %
Slag=70 lbs, 2.35 wt %
Fly Ash=140 lbs, 4.71 wt %
Quarry Dust Powder=1140 lbs, 38.38 wt %
Pea Stone ⅜ crushed=760 lbs, 25.58 wt %
SIlica Fume=40 lbs, 1.34 wt %                           40
Plastic=300 lbs, 10.10 wt %
Water Reducer=61 oz
Water=340 lbs, 40.74 gallons
Air Entrainment—as needed
Total Dry Weight=2970 lbs                               45

Test of Example 38—ASTM: C31, C138, C172,
C231, C1064, Compressive Strength Data: ASTM
C31 and ASTM C39

| Plastic Air % | Slump (in) | Mix Temp (° F.) | Unit Weight (lbs) | 1-Day psi (compressive strength) | 7-Day psi (compressive strength) | 28-Day psi (compressive strength) | 56-Day psi (compressive strength) |
|---|---|---|---|---|---|---|---|
| 4.1 | 21 | 76 | 126.1 | 1190 | 3180 | 3820 | 4730 |

The following Example 39 includes a composition of a cementitious mix according to an embodiment of the present invention:

60

Example 39

Cement Type III=520 lbs, 17.50 wt %
Slag=70 lbs, 2.35 wt %                                  65
Fly Ash=140 lbs, 4.71 wt %

Quarry Dust Powder ⅜ minus=1140 lbs, 38.38 wt %

Pea Stone ⅜ crushed=760 lbs, 25.58 wt %

Silica Fume=40 lbs, 1.34 wt %

Plastic=300 lbs, 10.10 wt %

Water Reducer=72 oz

Water=340 lbs, 40.74 gallons

Air Entrainment—as needed

Total Dry Weight=2970 lbs

Test of Example 39—ASTM: C31, C138, C172,

C231, C1064, Compressive Strength Data: ASTM

C31 and ASTM C39

| Plastic Air % | Slump (in) | Mix Temp (° F.) | Unit Weight (lbs) | 1-Day psi (compressive strength) | 7-Day psi (compressive strength) | 28-Day psi (compressive strength) | 56-Day psi (compressive strength) |
|---|---|---|---|---|---|---|---|
| 5 | 19 | 76 | 124.8 | 2310 | 3500 | 3900 | 5090 |

The following Example 40 includes a composition of a cementitious mix according to an embodiment of the present invention:

Example 40

Cement Type III=520 lbs, 17.44 wt %
Quarry Dust Powder=80 lbs, 2.68 wt %
Fly Ash=140 lbs, 4.69 wt %
Sand=1140 lbs, 38.25 wt %
Pea Stone ⅜ crushed=760 lbs, 25.50 wt %
Silica Fume=40 lbs, 1.34 wt %
Plastic=300 lbs, 10.06 wt %
Water Reducer=61 oz
Water=280 lbs, 33.55 gallons
Air Entrainment—as needed
Total Dry Weight=2980 lbs Test of Example 40—ASTM: C31, C138, C172,
C231, C1064, Compressive Strength Data: ASTM
C31 and ASTM C39

| Plastic Air % | Slump (in) | Mix Temp (° F.) | Unit Weight (lbs) | 1-Day psi (compressive strength) | 7-Day psi (compressive strength) | 28-Day psi (compressive strength) | 56-Day psi (compressive strength) |
|---|---|---|---|---|---|---|---|
| 6.4 | 17 | 76 | 123 | 2230 | 3020 | 3740 | 3980 |

The following Example 41 includes a composition of a cementitious mix according to an embodiment of the present invention:

Example 41

Cement Type III=520 lbs, 17.44 wt %
Quarry Dust Powder=80 lbs, 2.68 wt %
Fly Ash=140 lbs, 4.69 wt %
Sand=1140 lbs, 38.25 wt
Pea Stone ⅜ crushed=760 lbs, 25.50 wt %
Silica Fume=40 lbs, 1.34 wt %
Plastic=300 lbs, 10.06 wt %
Water Reducer=61 oz
Water=280 lbs, 33.55 gallons
Air Entrainment—as needed
Total Dry Weight=2980 lbs Test of Example 41—ASTM: C31, C138, C172,
C231, C1064, Compressive Strength Data: ASTM
and ASTM C39

| Plastic Air % | Slump (in) | Mix Temp (° F.) | Unit Weight (lbs) | 1-Day psi (compressive strength) | 7-Day psi (compressive strength) | 28-Day psi (compressive strength) | 56-Day psi (compressive strength) |
|---|---|---|---|---|---|---|---|
| 7.1 | 18 | 76 | 120.2 | 2470 | 3340 | 3820 | 4300 |

The following Example 42 includes a composition of a cementitious mix according to an embodiment of the present invention:

Example 42

Cement Type III=520 lbs, 17.44 wt %
Quarry Dust Powder=80 lbs, 2.68 wt %
Fly Ash=140 lbs, 4.69 wt %
Sand=1140 lbs, 38.25 wt %
Pea Stone ⅜ crushed=760 lbs, 25.50 wt %
Silica Fume=40 lbs, 1.34 wt %
Plastic=300 lbs, 10.06 wt %
Water Reducer=74 oz
Water=288 lbs, 34.51 gallons
Air Entrainment—as needed
Total Dry Weight=2980 lbs Test of Example 42—ASTM: C31, C138, C172, C231, C1064, Compressive Strength Data: ASTM C31 and ASTM C39

| Plastic Air % | Slump (in) | Mix Temp (° F.) | Unit Weight (lbs) | 3-Day psi (compressive strength) | 7-Day psi (compressive strength) | 28-Day psi (compressive strength) | 56-Day psi (compressive strength) |
|---|---|---|---|---|---|---|---|
| 5.1 | 18.5 | 73 | 122.1 | 2710 | 3500 | 4220 | 4530 |

The following Example 43 includes a composition of a cementitious mix according to an embodiment of the present invention:

Example 43

Cement Type III=520 lbs, 17.33 wt %
Quarry Dust Powder=240 lbs, 8 wt %
Sand=1140 lbs, 38 wt %
Pea Stone ⅜ crushed=760 lbs, 25.33 wt %
Silica Fume=40 lbs, 1.33 wt %
Plastic=300 lbs, 10 wt %
Water Reducer=61 oz
Water=320 lbs, 38.34 gallons
Air Entrainment—as needed
Total Dry Weight=3000 lbs Test of Example 43—ASTM: C31, C138, C172, C231, C1064, Compressive Strength Data: ASTM C31 and ASTM C39

| Plastic Air % | Slump (in) | Mix Temp (° F.) | Unit Weight (lbs) | 3-Day psi (compressive strength) | 7-Day psi (compressive strength) | 28-Day psi (compressive strength) |
|---|---|---|---|---|---|---|
| 7.4 | 21 | 74 | 120 | 2630 | 3500 | 4610 |
| 7.7 | 22.5 | 75 | 119.6 | 2550 | 3260 | 3740 |
| 7.1 | 23 | 77 | 119.8 | 2705 | 3660 | 3900 |

The following Example 44 includes a composition of a cementitious mix according to an embodiment of the present invention:

Example 44

Cement Type III=590 lbs, 19.21 wt %
Quarry Dust Powder=240 lbs, 7.81 wt %

Sand=1140 lbs, 37.13 wt %
Pea Stone ⅜ crushed=760 lbs, 24.75 wt %
Silica Fume=40 lbs, 1.30 wt %
Plastic=300 lbs, 9.77 wt %
Water Reducer=61 oz
Water=280 lbs, 33.55 gallons
Air Entrainment—as needed
Total Dry Weight=3070 lbs Test of Example 44—ASTM: C31, C138, C172, C231, C1064, Compressive Strength Data: ASTM C31 and ASTM C39

| Plastic Air % | Slump (in) | Mix Temp (° F.) | Unit Weight (lbs) | 3-Day psi (compressive strength) | 7-Day psi (compressive strength) | 28-Day psi (compressive strength) |
|---|---|---|---|---|---|---|
| 6.6 | 16 | 62 | 125 | 2940 | 3900 | 4300 |

The following Example 45 includes a composition of a cementitious mix according to an embodiment of the present invention:

Example 45

Cement Type III=630 lbs, 20.25 wt %
Quarry Dust Powder=240 lbs, 7.71 wt %
Sand=1140 lbs, 36.65 wt %
Pea Stone ⅜ crushed=760 lbs, 24.43 wt %
Silica Fume=40 lbs, 1.28 wt %
Plastic=300 lbs, 9.64 wt %
Water Reducer=61 oz
Water=280 lbs, 33.55 gallons
Air Entrainment—as needed
Total Dry Weight=3110 lbs Test of Example 45—ASTM: C31, C138, C172, C231, C1064, Compressive Strength Data: ASTM C31 and ASTM C39

| Plastic Air % | Slump (in) | Mix Temp (° F.) | Unit Weight (lbs) | 3-Day psi (compressive strength) | 14-Day psi (compressive strength) | 28-Day psi (compressive strength) |
|---|---|---|---|---|---|---|
| 7.3 | 15 | 62 | 124.2 | 3500 | 4060 | 4610 |

The following Example 46 includes a composition of a cementitious mix according to an embodiment of the present invention:

Example 46

Cement Type III=430 lbs, 14.42 wt %
Quarry Dust Powder/Sand Blend=1240 lbs, 41.61 wt %

¾ minus Granite Stone=720 lbs, 24.16 wt %
Cordierite=320 lbs, 10.73 wt %
Bottom Ash=220 lbs, 7.38 wt %
Silica Fume=50 lbs, 1.67 wt %
Water Reducer=61 oz
Water=380 lbs, 45.53 gallons
Air Entrainment—as needed
Total Dry Weight=2980 lbs Test of Example 46—ASTM: C31, C138, C172,
C231, C1064, Compressive Strength Data: ASTM
C31 and ASTM C39

| Plastic Air % | Slump (in) | Mix Temp (° F.) | Unit Weight (lbs) | 28-Day psi (compressive strength) | 56-Day psi (compressive strength) |
|---|---|---|---|---|---|
| — | — | — | — | 4060 | 3860 |

The following Example 47 includes a composition of a cementitious mix according to an embodiment of the present invention:

Example 47

Sand/Quarry Dust Powder ⅜ Minus=1470 lbs, 47.11 wt %
Cement Type III=800 lbs, 25.64 wt %
Limestone/Coarse Aggregate=500 lbs, 16.02 wt %
Plastic=200 lbs, 6.41 wt %
Fly Ash=100 lbs, 3.20 wt %
Silica Fume=50 lbs, 1.60 wt %
Water Reducer=52 oz
Water=360 lbs, 43.13 gallons
Air Entrainment—as needed
Total Dry Weight=3120 lbs Test of Example 47—ASTM: C31, C138, C172,
C231, C1064, Compressive Strength Data: ASTM
C31 and ASTM C39

| Plastic Air % | Slump (in) | Mix Temp (° F.) | Unit Weight (lbs) | 1-Day psi (compressive strength) | 7-Day psi (compressive strength) |
|---|---|---|---|---|---|
| 3.2 | 21 | 68 | 128.7 | 3300 | 5010 |

The following Example 48 includes a composition of a cementitious mix according to an embodiment of the present invention:

Example 48

Cement Type III=800 lbs, 22.79 wt %
Sand/Quarry Dust Powder=2000 lbs, 56.98 wt %
¾ minus Granite Stone=660 lbs, 18.80 wt %
Silica Fume=50 lbs, 1.42 wt %
Water Reducer=76 oz
Water=340 lbs, 40.74 gallons
Air Entrainment—as needed
Total Dry Weight=3510 lbs Test of Example 48—ASTM: C31, C138, C172,
C231, C1064, Compressive Strength Data: ASTM
C31 and ASTM C39

| Plastic Air % | Slump (in) | Mix Temp (° F.) | Unit Weight (lbs) | 1-Day psi (compressive strength) | 7-Day psi (compressive strength) |
|---|---|---|---|---|---|
| 4.6 | 19 | 68 | 140.8 | 4220 | 6920 |

The following Example 49 includes a composition of a cementitious mix according to an embodiment of the present invention:

Example 49

Sand/Quarry Dust Powder ⅜ Minus=1570 lbs, 50.32 wt %
Cement Type III—800 lbs, 25.64 wt %
Limestone/Coarse Aggregate=500 lbs, 16.02 wt %
Plastic—200 lbs, 6.41 wt %
Silica Fume=50 lbs, 1.60 wt %
Water Reducer=80 oz
Water=340 lbs, 40.74 gallons
Air Entrainment—as needed
Total Dry Weight=3120 lbs Test of Example 49—ASTM: C31, C138, C172,
C231, C1064, Compressive Strength Data: ASTM
C31 and ASTM C39

| Plastic Air % | Slump in | Mix Temp (° F.) | Unit Weight (lbs) | 1-Day psi (compressive strength) | 7-Day psi (compressive strength) |
|---|---|---|---|---|---|
| 3 | 19 | 83 | 131.8 | 4200 | 5490 |

The disclosure of which described above is not limited to the materials and features described therein, and may be changed within the scope of one ordinary skill in the art.

What is claimed is:

1. A cementitious composition, comprising:
9-30 weight percent (wt %) of cement, wherein the wt % is defined relative to a total dry weight of the cementitious composition, the total dry weight being a weight of the cementitious composition prior to adding water;
1-55 wt % of at least one of fly ash and bottom ash;
14-60 wt % of sand;
1.9-4.5 wt % of slag; and
0.5-6 wt % of plastic.

2. The cementitious composition of claim 1, wherein the plastic is about 1.5 wt %, and
wherein the cementitious composition further comprises polyethylene separate from the plastic having a wt % of about 0.1.

3. The cementitious composition of claim 2, further comprising about 2 wt % of glass, and
wherein the fly ash or bottom ash is about 15 wt %.

4. The cementitious composition of claim 1, further comprising about 4 wt % of tire chips or 5-8 wt % of asphalt millings.

5. The cementitious composition of claim 1, further comprising:

16-30 wt % of stone or crushed brick.

6. The cementitious composition of claim 1, further comprising:

about 1 wt % of cordierite, and wherein the slag is about 2 wt %.

7. The cementitious composition of claim 6, wherein the cement is about 18 wt %, and wherein the fly ash or bottom ash is about 3 wt %.

8. The cementitious composition of claim 7, wherein the plastic is about 4 wt %, and wherein the sand is about 42 wt %.

9. The cementitious composition of claim 1, further comprising about 18 wt % of stone, and wherein the plastic is about 3.7 wt %.

10. The cementitious composition of claim 1, further comprising 1-5 wt % of silica fume, and wherein the plastic is about 2-5 wt %.

11. The cementitious composition of claim 1, further comprising about 8 wt % of asphalt millings, and wherein the fly ash is about 4 wt %.

12. The cementitious composition of claim 1, further comprising about 8 wt % of quarry dust powder, and wherein the fly ash is about 4 wt % relative to the total dry weight.

13. The cementitious composition of claim 1, further comprising:

about 8 wt % of quarry dust powder, and about 8 wt % of asphalt millings, and wherein the fly ash is about 4 wt %.

14. The cementitious composition of claim 13, further comprising about 16 wt % of stone.

15. The cementitious composition of claim 14, wherein the plastic is about 4 wt %, wherein the cementitious composition further comprises about 0.1 wt % of polyethylene separate from the plastic, and wherein the sand is about 43 wt %.

16. The cementitious composition of claim 15, further comprising about 4 wt % of slag, and wherein the fly ash is about 4 wt %.

17. A cementitious composition, comprising:

10-25 weight percent (wt %) of cement, wherein the wt % is defined relative to a total dry weight of the cementitious composition, the total dry weight being a weight of the cementitious composition prior to adding water;

3-15 wt % of at least one of fly ash and bottom ash;

40-60 wt % of sand;

1.9-4.5 wt % of slag; and 1.5-5 wt % of plastic.

18. The cementitious composition of claim 17, further comprising about 2 wt % of glass, wherein the cementitious composition further comprises about 0.1 wt % of polyethylene separate from the plastic, wherein the fly ash or bottom ash is about 15 wt %, and wherein the cement is about 25 wt %.

19. The cementitious composition of claim 17, further comprising about 1 wt % of cordierite, wherein the fly ash or bottom ash is about 3 wt %, and wherein the cement is about 19 wt %.

20. The cementitious composition of claim 17, further comprising:

about 8 wt % of quarry dust powder;

about 8 wt % of asphalt millings; and wherein the plastic is about 4 wt %, wherein the fly ash is about 4 wt %, and wherein the cement is about 10 wt %.

* * * * *